Nov. 24, 1942. J. F. PFEIFER 2,302,952
MIRROR ATTACHMENT FOR AUTOMOBILES
Filed April 14, 1941
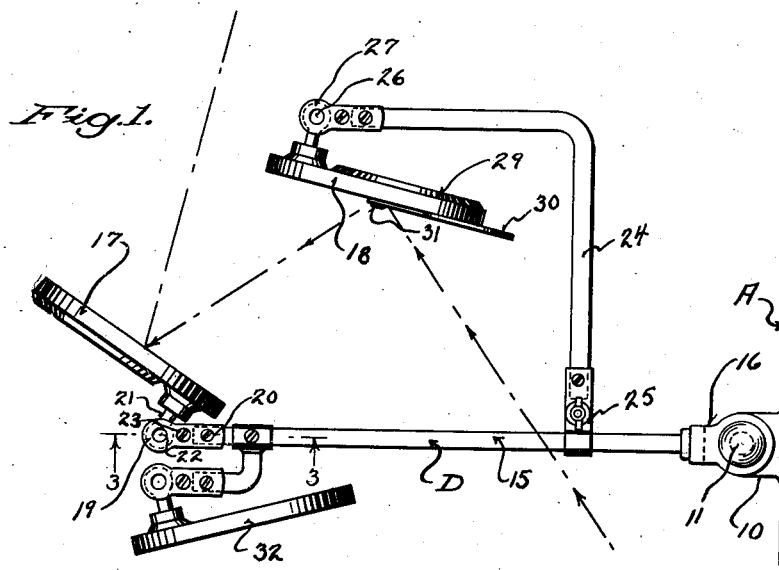
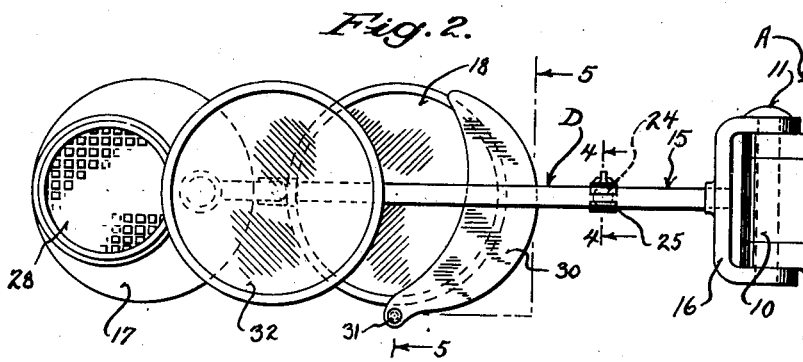
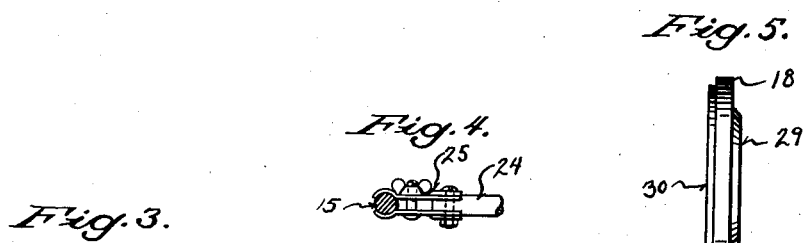
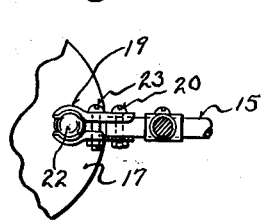
INVENTOR
J.F. PFEIFER
BY
ATTORNEYS Patented Nov. 24, 1942

2,302,952

UNITED STATES PATENT OFFICE 2,302,952

MIRROR ATTACHMENT FOR AUTOMOBILES

John F. Pfeifer, Milwaukee, Wis.

Application April 14, 1941, Serial No. 388,473

2 Claims. (Cl. 88—87)

This invention appertains to vehicle attachments, and more particularly to a novel device for facilitating the safe passing of automobiles on a congested highway.

One of the primary objects of my invention is to provide a novel arrangement of mirrors, by means of which the driver of an automobile can see around and in front of the car (for instance, a large moving van) immediately ahead to determine whether the road is clear so that the passing of the car ahead can be accomplished in safety.

Another important object of my invention is to provide an opaque shield or guard associated with the driver's vision mirror of the deivce in a novel manner, whereby the driver will be prevented from seeing his own reflection and the interior of his car in the mirror, so that he will not be distracted or confused thereby, and will be permitted a clear view of the road ahead reflected from the road mirror onto the driver's vision mirror.

A still further object of my invention is to provide a novel attachment for automobiles of the above character, which will be durable and efficient in use, one that will be simple and easy to manufacture, and one which can be associated with an automobile at a small cost.

With these and other objects in view, the invention consists in the novel construction, arrangement, and formation of parts, as will be hereinafter more specifically described, claimed, and illustrated in the accompanying drawing, in which drawing:

Figure 1 is a top plan view of my novel device.

Figure 2 is a rear elevational view of my appliance.

Figure 3 is a detail sectional view taken on the line 3—3 of Figure 1, looking in the direction of the arrows, illustrating the mounting of certain of the mirrors.

Figure 4 is a detail sectional view taken on the line 4—4 of Figure 2, looking in the direction of the arrows, illustrating one means for adjustably mounting the inner mirror supporting arm on the main bracket rod.

Figure 5 is a detail, horizontal, sectional view taken on the line 5—5 of Figure 2, looking in the direction of the arrows, illustrating one form of means for adjustably mounting the shade or shield on the inner or driver's vision mirror.

Referring to the drawing in detail, wherein similar reference characters designate corresponding parts throughout the several views, the letter D generally indicates my novel device, which is adapted to be associated with an automobile A. Only a fragment of the automobile A has been shown, and the same can be of any preferred size, make, or style. The automobile A includes a front door hinge 10.

The device D includes the main supporting rod 15, which is adapted to be secured to the lefthand side of an automobile forwardly of the driver's seat. The inner end of the rod 15 can be secured in any desired way to the side of the automobile, and, as shown, the rod carries a U-shaped bracket 16 for straddling the hinge 10 of the front lefthand door of the automobile. The pintle 11 for the hinge 10 is utilized for holding the U-shaped bracket 16 in place.

The rod 15 supports an outer or road mirror 17 and an inner or driver's vision mirror 18. I prefer to employ a split ball socket 19 for adjustably connecting the mirror 17 to the rod 15, and this socket 19 is secured to the rod 15 in any suitable way, such as by a bolt 20. The mirror 17 can be formed in a manner best suited to the taste of the manufacturer, and the rear face of the mirror carries a rearwardly extending stem 21, having formed thereon or secured thereto a ball head 22 for reception in the split socket 19. A bolt 23 can be employed for tightening the socket around the ball 22, so as to prevent loose play between the mirror and the rod 15.

The inner or driver's vision mirror 18 is adjustably mounted on the outer end of an L-shaped arm 24. This arm carries an adjustable clamp 25 for frictionally gripping the rod 15, and by loosening and tightening the clamp 25, the arm can be held in different adjusted positions along the length of the rod. The mirror 18 is adjustably connected to the outer end of the L-shaped arm 24 in the same manner as the mirror 17 is connected to the rod 15, and, hence, the front face of the mirror carries a ball 26 for reception in a friction split ball socket 27.

From the construction so far it can be seen that the mirrors 17 and 18 can be readily swung to different adjusted positions relative to one another, so that when the device D is connected to a certain type of automobile, the driver will be enabled to move the mirrors to selected positions, which will enable him to see ahead clearly, and to see the righthand side of the road by looking into the mirror 18.

In use of my device, when the mirrors are properly adjusted relative to one another, the driver, by looking into the mirror 18, will be enabled to see the reflection of a car ahead of an automobile immediately in front of his car, and this will enable him to pass automobiles in safety on congested highways.

The rear or non-reflecting face of the mirror 17 can be provided with a red reflector 28, while the front non-reflecting face of the mirror 18 can be provided with an amber colored reflector 29. These reflectors 28 and 29 will pick up the rays of automobile headlights and enhance safe driving at night.

In the adjustment of the mirror 18, the driver of the vehicle is often enabled to see his own reflection in the righthand face of the mirror, or the interior of his car. This tends to distract or confuse the driver.

In order to eliminate this reflection, I provide an opaque shield or guard 30, and this shield is formed from non-reflecting material. As illustrated in Figure 2, the shield 30 is preferably of a quarter-moon shape, and one end of the same is mounted on a pivot stud 31 carried by the frame of the mirror 29. The pivot stud is provided with a head, and the shield is held tight against the mirror, so that the same will be held by friction in an adjusted position. By mounting the shield on the pivot stud, the shield can be swung in and out for blocking out more or less of the reflecting face of the mirror 18 at the righthand side thereof (see Figure 2). Other means can be utilized for adjustably mounting the shield on the mirror.

The rod 15 can also be utilized for supporting a rear view mirror 32, and this rear view mirror is adjustably mounted on the rod in any manner deemed advisable by the manufacturer of the appliance.

Changes in details may be made which do not depart from the spirit and scope of my claims, and what I claim as new is:

1. In a mirror attachment for automobiles for permitting the observing of traffic in front of a car immediately ahead of an automobile equipped with the attachment including, a straight supporting rod, an outer road mirror adjustably mounted on the outer end of the rod having a front reflecting face, means carried by the inner end of the rod for securing the same to an automobile, an L-shaped arm having its inner end adjustably mounted on the rod for longitudinal movement thereon between the ends of the rod, and a second mirror adjustably mounted on the outer end of the L-shaped arm disposed in advance of the first mirror and having a rear reflecting face for receiving an image from said first mirror.

2. In an attachment for automobiles, a round mirror, an opaque crescent-shaped shade disposed over the reflecting face of the mirror, and means pivotally securing one end of the shade to the edge of the mirror, whereby the shade can be swung to different positions over the mirror or to one side of the mirror.

JOHN F. PFEIFER.